(12) United States Patent
Matsuura

(10) Patent No.: US 6,810,330 B2
(45) Date of Patent: Oct. 26, 2004

(54) APPARATUS FOR AND METHOD OF DETECTING OBJECT ON ROAD

(75) Inventor: Yoshio Matsuura, Kyoto (JP)

(73) Assignee: Omron Corporation, Kyoto (JP)

(*) Notice: Subject to any disclaimer, the term of this patent is extended or adjusted under 35 U.S.C. 154(b) by 10 days.

(21) Appl. No.: 10/197,171

(22) Filed: Jul. 15, 2002

(65) Prior Publication Data

US 2003/0028291 A1 Feb. 6, 2003

(30) Foreign Application Priority Data

Jul. 31, 2001 (JP) ........................................ 2001-231249
Aug. 23, 2001 (JP) ........................................ 2001-252290

(51) Int. Cl.[7] .................................................. B60Q 1/00
(52) U.S. Cl. ...................... 701/301; 701/117; 701/118; 340/435; 367/909; 382/106
(58) Field of Search ................................ 701/301, 117, 701/118; 340/435, 436, 437, 903, 904; 180/169; 367/909; 382/106

(56) References Cited

U.S. PATENT DOCUMENTS 4,257,703 A * 3/1981 Goodrich .................. 356/4.03
4,561,064 A * 12/1985 Bruggen et al. ............ 702/159
5,754,099 A * 5/1998 Nishimura et al. .......... 340/435

* cited by examiner

*Primary Examiner*—Thomas G. Black
*Assistant Examiner*—Arthur D. Donnelly
(74) *Attorney, Agent, or Firm*—Beyer Weaver & Thomas LLP

(57) ABSTRACT

A detector set on a motor vehicle emits a beam of light forward and receives a beam reflected from an object and determines the distance to the object. Displacement in the direction of emission of the beam is detected and corrected by recognizing the received beam as having been reflected by an overhead beam reflector of a known height of a part of the road surface and by measuring the distance to the point where the reflection has taken place. The slope of the beam-reflecting road surface may be used to determine the displacement of the direction of beam emission. The speedometer of the motor vehicle may be checked to determine whether it is running at a constant speed such that only measurements taken while the vehicle is running smoothly can be used for the calculation.

18 Claims, 14 Drawing Sheets

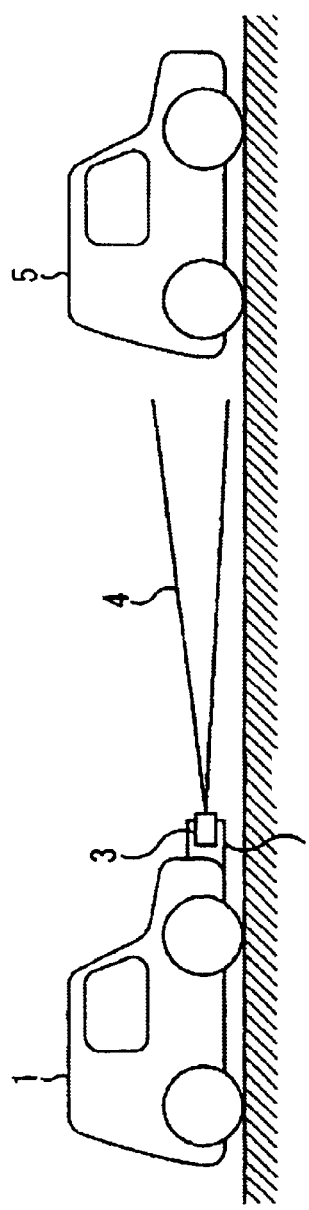
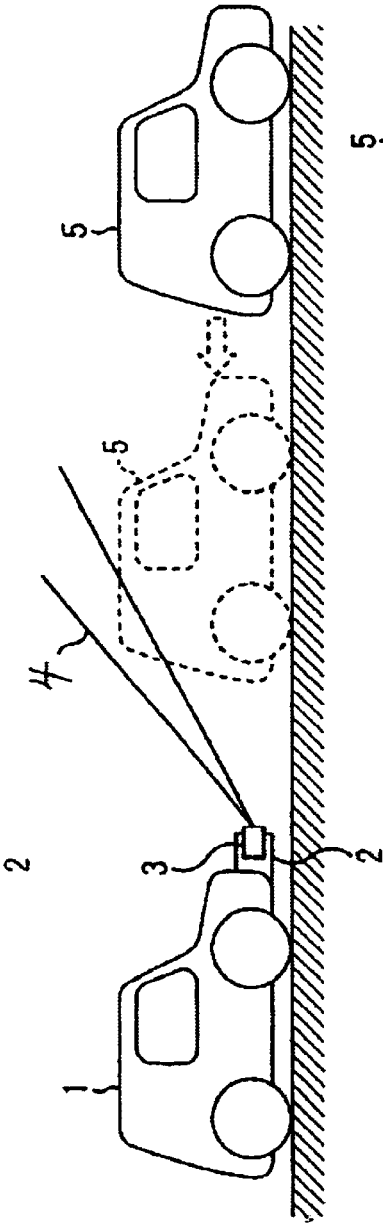
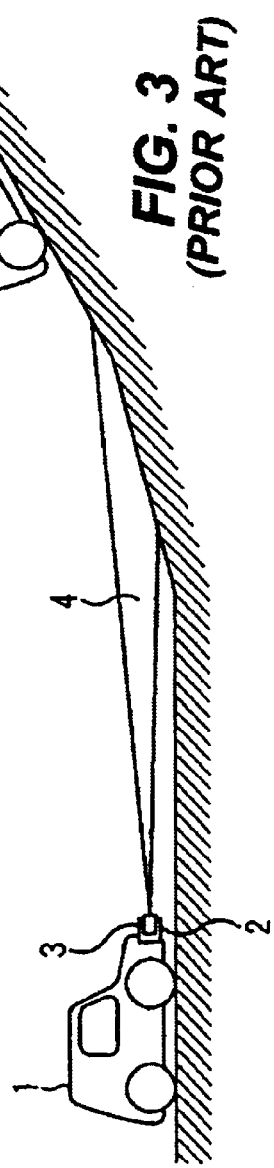
FIG. 1 (PRIOR ART)
FIG. 2 (PRIOR ART)
FIG. 3 (PRIOR ART)

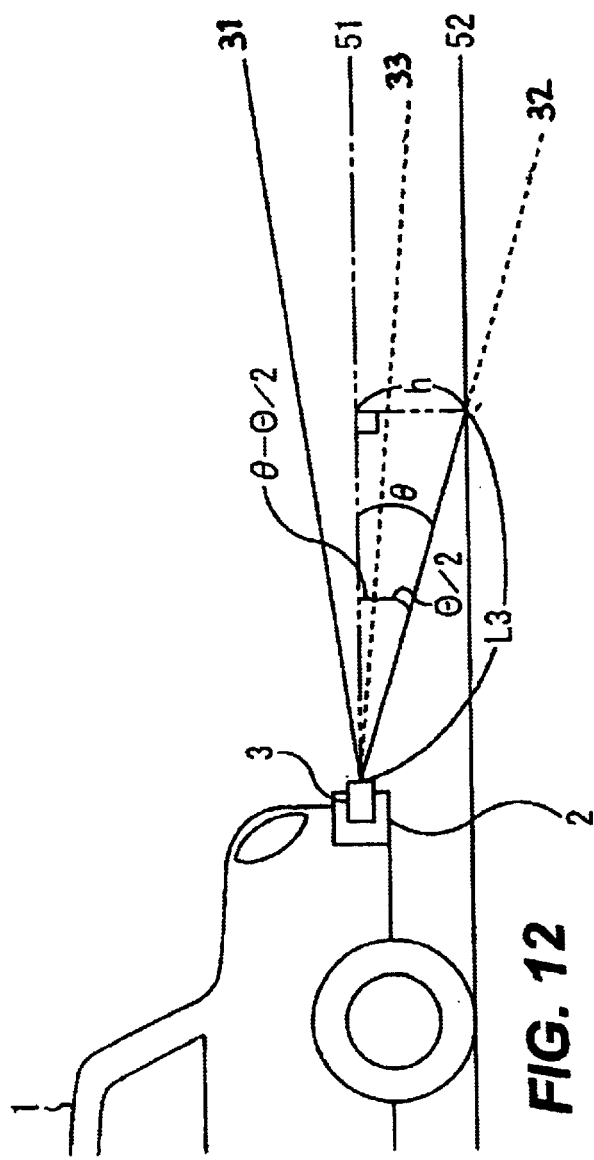
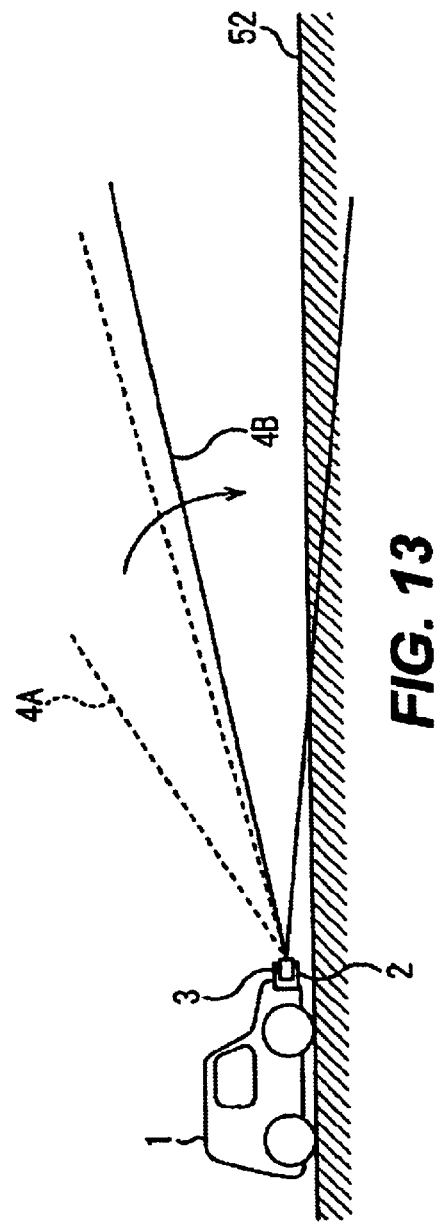
FIG. 12
FIG. 13

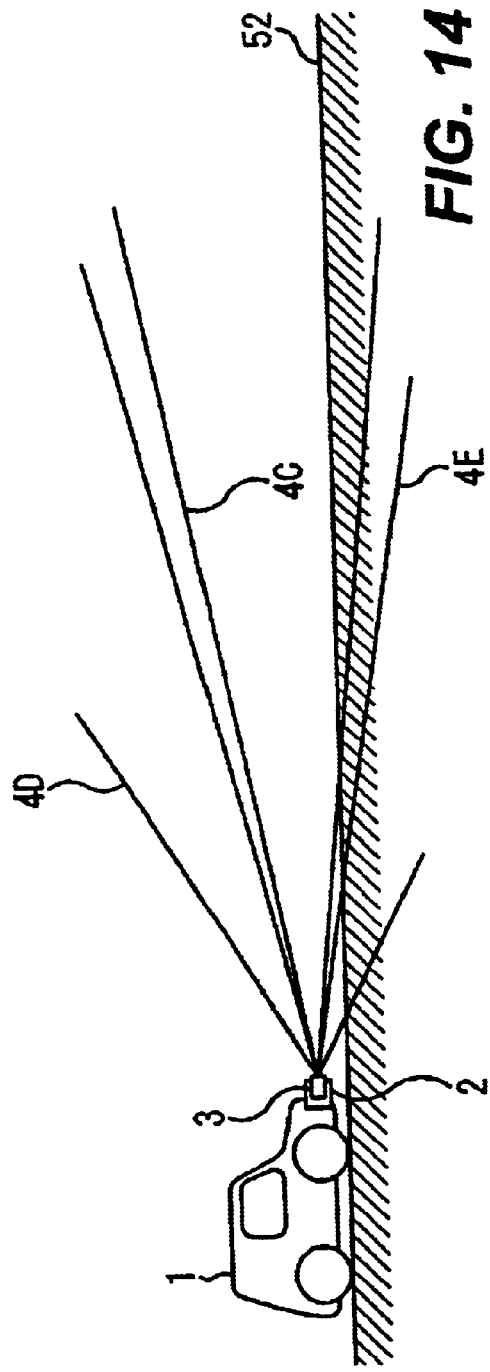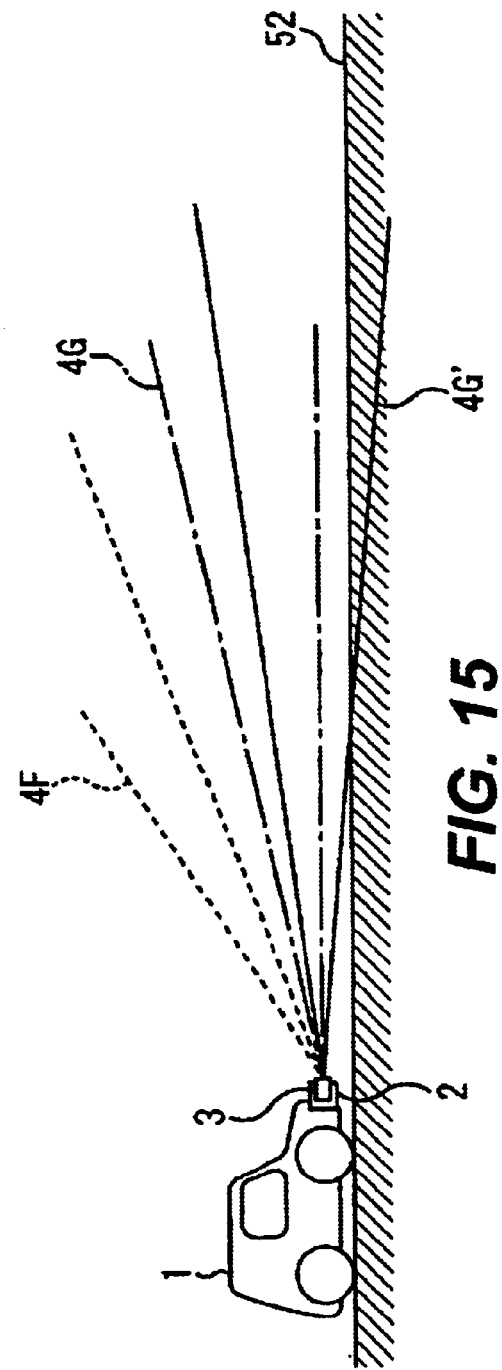

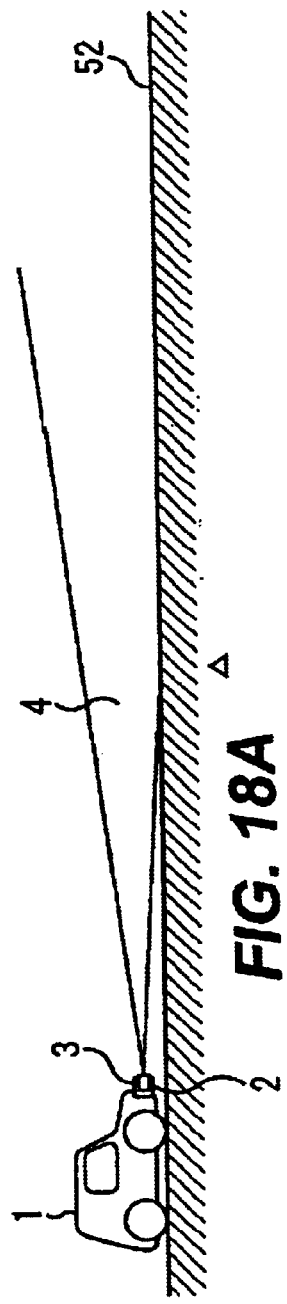
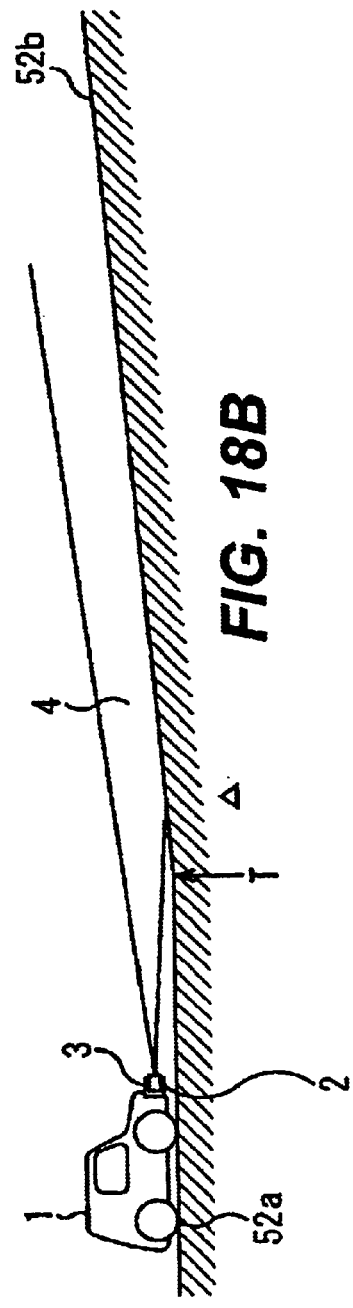
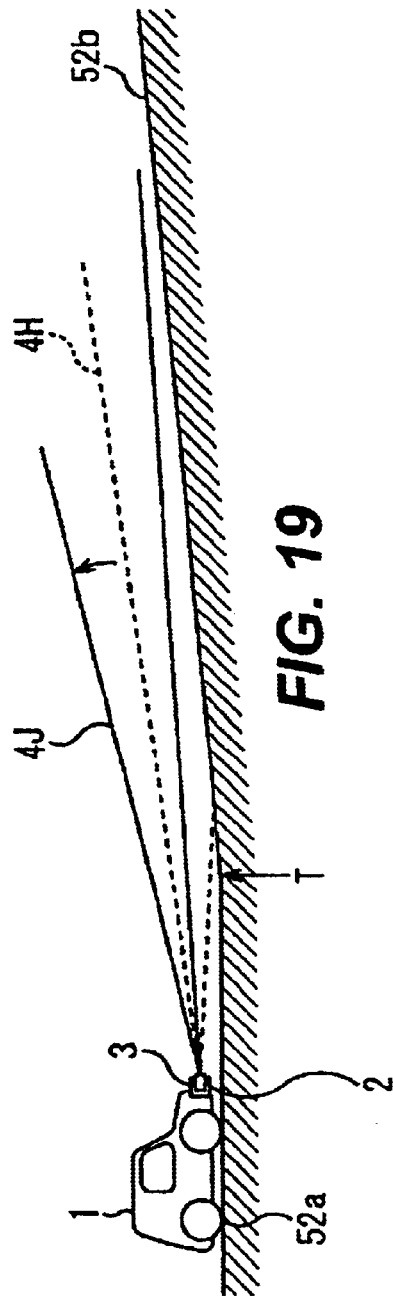
FIG. 18A
FIG. 18B
FIG. 19

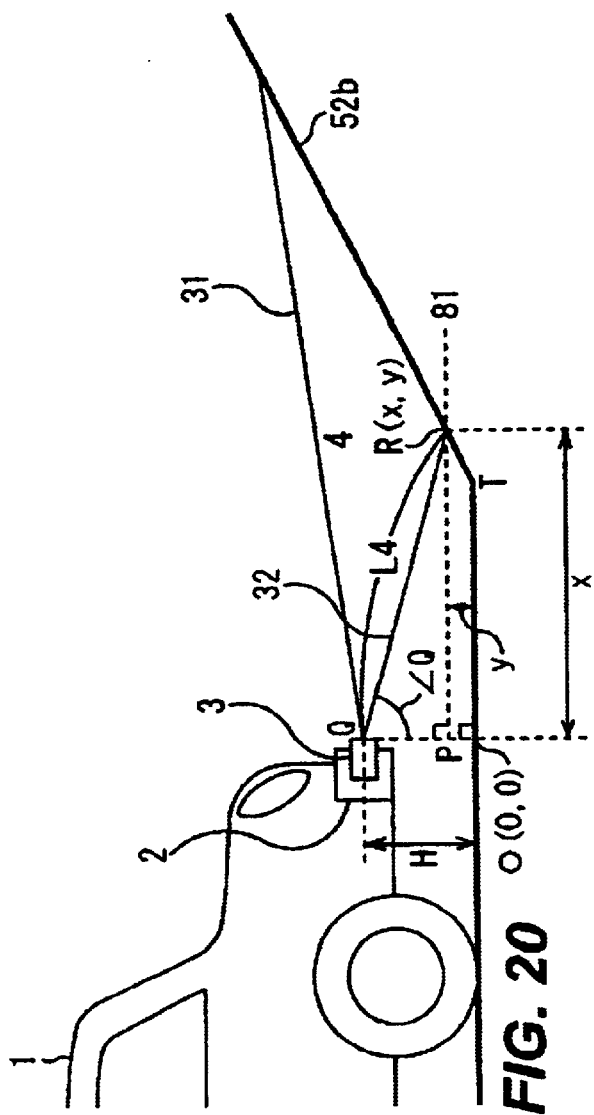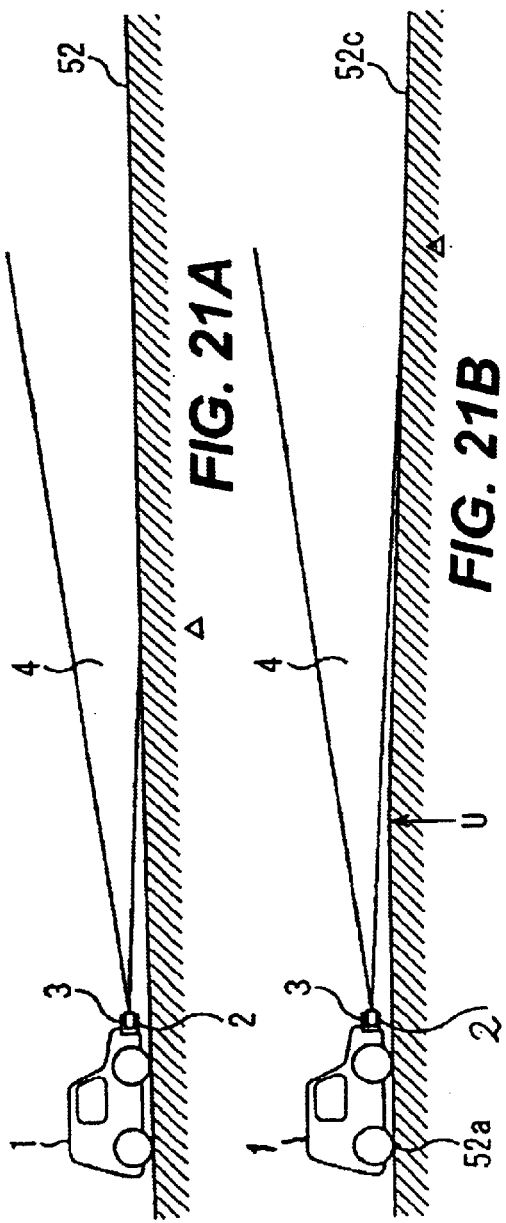

APPARATUS FOR AND METHOD OF DETECTING OBJECT ON ROAD

BACKGROUND OF THE INVENTION

This invention relates to apparatus for and methods of detecting a target object and more particularly to apparatus for and methods of optically detecting a target object on a road from a vehicle by also detecting the deviation of the optical axis of the light emitted for the detection. The invention also relates to such apparatus and methods capable of adjusting the orientation of the optical axis optimally.

It has been known to install a laser radar on a motor vehicle for measuring the distance to a vehicle ahead and to cause an alarm signal outputted if the measured distance becomes less than a specified safety distance, thereby advising the driver to keep a larger distance or to automatically control the speed of the vehicle to increase the separation. FIG. 1 shows an example of such a detector 2 installed in a car (or the user's "own car") 1. The detector 2 includes a laser radar 3. As a beam of laser light 4 is emitted from the laser radar 3 and reflected by the back surface of a car 5 ahead of and moving in the same direction as the user's car 1, the reflected light is received by the laser radar 3 and the detector 2 measures the time between the emission of the laser light 4 from the laser radar 3 and its reception after being reflected by the car 5 in front and calculates the distance in between based on this measured time. If it is determined that the distance thus calculated is not a safe distance (within which the own car 1 is thought to be able to stop when the car in front 5 is involved in an accident or stops suddenly), a warning signal may be outputted to increase the distance between the cars or the speed of the own car 1 is controlled so as to maintain a safe distance in between.

Such a detector, however, is not cable of correctly measuring the distance to the car 5 in front if the optical axis of the laser light 4 emitted from the laser radar 3 is displaced. FIG. 2 shows such a situation when the angle of light emission from the laser light 4 is displaced upward, for example, as a result of a body deformation due to a collision or because the general loosening of body parts after years of use. In a situation as shown in FIG. 2, the reflected portion of the emitted laser light 4 cannot be received by the laser radar 3 until the separation between the two cars is as shown by the broken lines in FIG. 2. In other words, there were frequently situations with a prior art detector where the car in front could not be detected until the distance in between was too short to be safe.

Even if the detector 2 is properly installed such that the laser radar transmits its light in the desired direction but if the road is sloped as shown in FIG. 3, however, the detector 2 may not be able to properly detect the car 5 in front, the laser light 4 being reflected by the road surface. In other words, the prior art detector could not dependably warn the driver of a potentially dangerous situation.

In view of these problems, Japanese Patent Publication Tokkai 11-194169 disclosed a detector to be installed on a vehicle including detecting means for detecting the tilting angle of the detector itself with respect to the road surface, as well as selecting one of a plurality of laser radars emitting an optimum laser beam according to the detected tilting angle. The detector includes not only a first laser radar for emitting laser light parallel to the road surface for measuring the distance to the car in front but also a second laser radar and a third laser radar for emitting laser light at specified angles towards the road surface in order to detect the sloping angle of the detector itself with respect to the road surface. The detector calculates the sloping angle of its own optical axis on the basis of measurements by the second and third laser radars and then the direction of the optical axis of the laser light emitted from the first laser radar. On the basis of this detection, one of a plurality of detection beams is selected.

This detector is disadvantage firstly because the second and third laser radars are required in addition to the first laser radar and this makes the detector large as a whole and more expensive. Moreover, this detector treats the angles of the optical axes of the laser light as standard values, and the angle of the optical axis of the laser light with respect to the road surface is calculated only indirectly from the angle of the detector with respect to the road surface. Thus, if the angles of the optical axes of the laser light with respect to the detector are different from values which were specified by the design, the angles of the optical axes with respect to the road surface cannot be calculated accurately. Still another disadvantage of this detector is that it can detect the changes in the road condition directly below the detector but the changes in the slope in front of the vehicle cannot be detected.

SUMMARY OF THE INVENTION

It is therefore an object of this invention to provide a detector of a simple structure for a vehicle capable of detecting the displacement of the optical axis of the laser light.

It is another object of the invention to provide such a detector capable of using the laser light from its laser radar to detect and correct the displacement of its optical axis and adjusting the angle of its light emission.

A detector for an object on a road surface according to this invention may be characterized as comprising beam emitting means for emitting a beam, beam receiving means for receiving reflected beam of the beam emitted from the beam emitting means by an object, distance measuring means for measuring a distance to the object from the reflected beam received by the beam receiving means, recognizing means for recognizing an overhead beam reflector with a known height based on the reflected beam received by the beam receiving means, distance identifying means for identifying a distance to the overhead beam reflector immediately before it becomes unrecognizable by the recognizing means, and displacement detecting means for detecting a directional displacement of the beam emitted from the beam emitting means based on the distance to the overhead beam identified by the distance identified means. The beam emitting and receiving means may be a laser radar emitting laser light and receiving light reflected from the road surface ahead or an object on the road surface. The distance measuring, recognizing and distance identifying means may be realized by what is referred to as a recognizer unit below, continuously calculating the distance between the device and an overhead beam reflector until it becomes unrecognizable and identifying the calculated distance immediately before it becomes unrecognizable. The displacement detecting means serves to calculate the vertical displacement in the direction of the beam outputted from the laser radar on the basis of the known height of the overhead beam reflector and the height of the detector itself, say, set on a motor vehicle.

The detector may also include correcting means for correcting the directional displacement of the optical axis of the emitted beam detected by the displacement detecting means by calculating a correction angle with an angle calculator and correcting the angle with an angle controller based on the correction angle calculated by the angle calculator. The correcting means may adjust the direction of emission from a laser radar by continuously changing the angle of emission in a vertical direction. Alternatively, a plurality of emission angles may be preselected in a vertical direction and the correcting means may correct the directional displacement by selecting one of these preselected angles.

The detector may further include displacement judging means for judging whether or not the directional displacement detected by the displacement detecting means is within a specified range, and warning means for outputting a warning signal when the displacement judging means judges that the directional displacement detected by the displacement detecting means is not within the specified range. Such a range may be determined such that the detector can calculate the distance with an error small enough to be practical as long as the displacement in the direction of the emitted light is within this specified range. The warning means may output a warning signal by displaying a warning indicator or a vocal message, reminding the driver of the vehicle that the detector is not operating normally. With the detector thus prepared, accidents caused by a failure of the detector to measure the distance to an object correctly can be prevented.

The detector of the invention is intended to be installed on a motor vehicle and may also comprise speed detecting means such as a speedometer for detecting a running speed of the motor vehicle on which it is installed, and speed judging means for judging whether or not the motor vehicle is traveling at a stable rate on the basis of outputs from the speed detecting means such that the displacement detecting means detects the directional displacement only when the speed judging means judges that the motor vehicle is running at a stable rate. If such a control unit is provided, miscalculations of the displacement of the direction of light emission can be prevented because the displacement is calculated only when the motor vehicle is running smoothly at a constant speed.

A method according to this invention of detecting an object on a road surface may be characterized as comprising the steps of emitting a beam, receiving a reflected beam of the emitted beam by an object, measuring a distance to the object based on the received reflected beam, recognizing an overhead beam reflector with a known height based on the received reflected beam, identifying a distance to the overhead beam reflector immediately before the overhead beam reflector becomes unrecognizable, and detecting a directional displacement of the emitted beam based on the distance to the identified overhead beam reflector. The method may further comprise a step of correcting the directional displacement.

In summary, with the detector and detection method embodying this invention as described above, a beam is emitted and when it is reflected by an object on a road surface and the reflected beam is received, the distance to the reflecting object is calculated on the basis of the reflected beam which has been received. When an overhead beam reflector with a known height is recognized based on the received reflected beam, the distance to such an overhead beam reflector is calculated and its value immediately before it becomes unrecognizable is identified. The displacement of the direction of the emitted beam is detected based on this identified distance and may be corrected.

A detector according to a second embodiment of the invention may be characterized as being similar to the one according to the first embodiment described above but different therefrom wherein the detector is provided with judging means for judging whether or not the object which reflected the emitted beam and received by the receiving means was the road surface itself and distance identifying means for identifying a distance to the road surface where the reflection took place if the judging means judges that the object which reflected the emitted beam and received by the receiving means was the road surface, and the displacement detecting means detects the displacement based on the distance to the beam-reflecting road surface identified by the distance identifying means. The detector may further comprise correcting means for correcting the detected displacement based on the distance to the road surface.

A method according to the second embodiment of the invention may be likewise characterized as being similar to the one according to the first embodiment described above but different therefrom for comprising the steps of judging whether or not the object which reflected the received beam was the road surface and identifying a distance to that light-reflecting part of the road surface if it has been judged that the beam-reflecting object was the road surface itself.

The first and second embodiments may be combined such that the angle of emitted beam can be detected and corrected, if necessary, by receiving a reflected beam and recognizing this either as a beam reflected from an overhead beam reflector of a known height or a beam reflected by a road surface.

As a further variation, the angle of emitted beam may be detected and corrected by calculating the slope of the road surface from where the reflected beam is received.

BRIEF DESCRIPTION OF THE DRAWINGS

FIG. 1 is a schematic drawing for showing the principle of detection by a prior art detector.

FIG. 2 is a schematic drawing for showing the displacement of optical axis by a prior art detector.

FIG. 3 is a schematic drawing for showing the failure by a prior art detector to detect a car in front.

FIG. 12 is a drawing for showing another method of detecting a displacement of optical axis.

FIG. 13 is a drawing for showing a method of correcting a displacement of optical axis with the detector shown in FIG. 9.

FIG. 14 is a drawing for showing another method of correcting a displacement of optical axis with the detector shown in FIG. 9.

FIG. 15 is a drawing for showing still another method of correcting a displacement of optical axis with the detector shown in FIG. 9.

FIG. 18 is a drawing for explaining the method of calculating the slope of a road surface by the detector shown in FIG. 16.

FIG. 19 is a drawing for showing the detector shown in FIG. 16 when the road surface is sloped.

FIG. 20 is another drawing for showing the method of calculating the slope of a road surface by using the detector shown in FIG. 16.

FIG. 21 is still another drawing for showing the method of calculating the slope of a road surface by using the detector shown in FIG. 16.

Throughout herein, like or corresponding components are indicated by the same numerals and may not necessarily be described in a repetitious manner even where they are components of different apparatus.

DETAILED DESCRIPTION OF THE INVENTION

Figure 4:
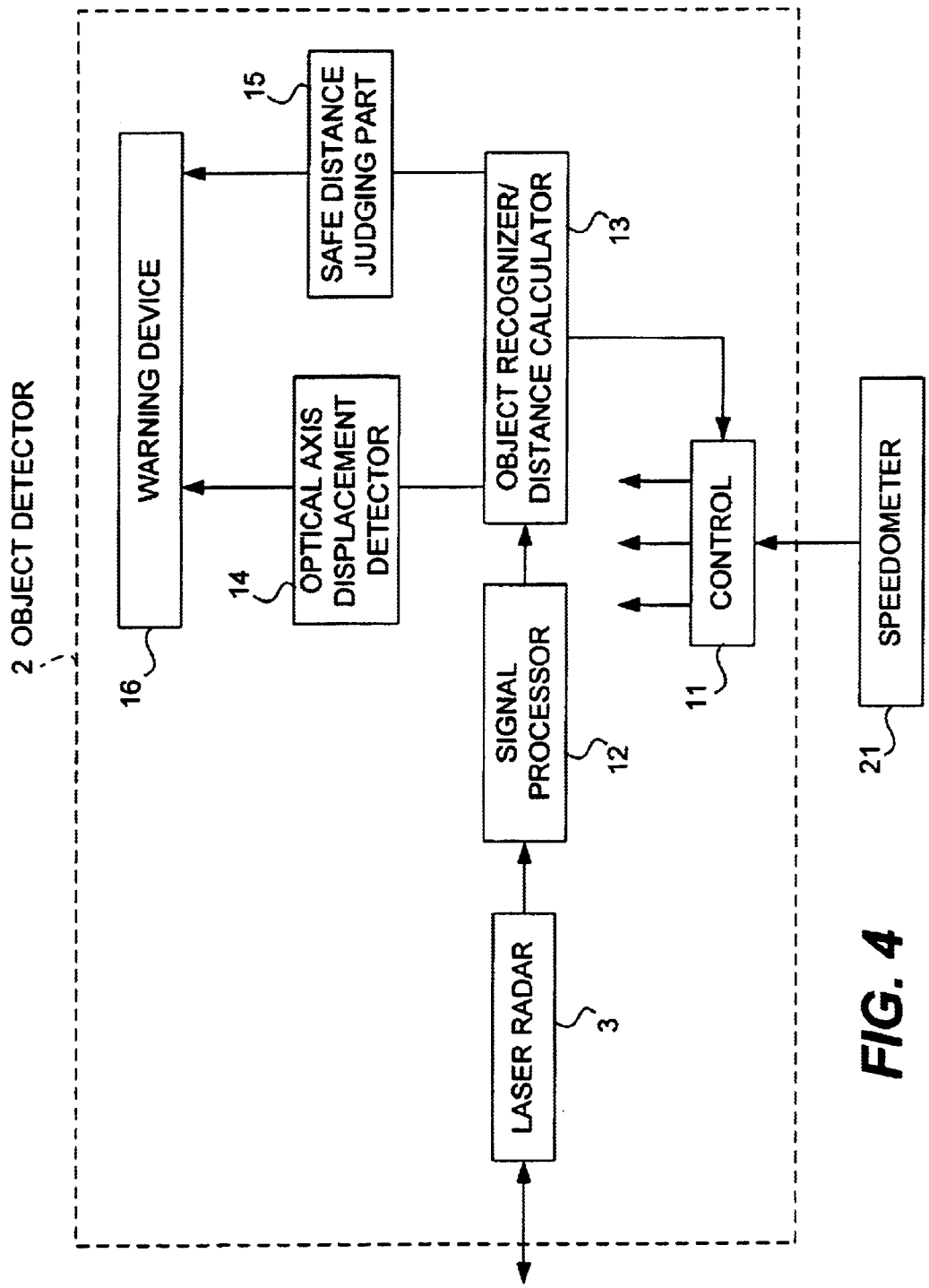
FIG. 4 is a block diagram of a detector for a vehicle embodying this invention.

The structure of a detector 2 embodying this invention is described next with reference to the block diagram shown in FIG. 4 wherein numeral 11 indicates a control unit serving to control components of the detector 2 according to a predetermined control program, determining the presence and absence of a car in front, measuring the distance to the car in front if there is one detected and determining if it is a safe distance and outputting a warning to the driver if it is not a safe distance. If a signal is received from an object recognizing/distance calculating unit (hereinafter the "recognizer unit") 13 indicating that the presence of an overhead beam reflector or a road surface has been acknowledged, the control unit 11 makes reference to a signal indicative of the speed of the own car 1 received from a speedometer 21 to determine whether the own car 1 is running at a constant speed or accelerating. If it is determined that the own car 1 is running at a constant speed without accelerating, a specified processing routine is carried out as explained below for detecting the displacement of the optical axis.

The laser radar 3 serves to emit laser light 4 under the control of the control unit 11 and to receive light reflected from a reflective object such as an overhead beam reflector of a known height or a road surface, carries out photoelectric conversion and transmits the converted signal to a signal processor 12. The signal processor 12 serves to perform specified processes on signals corresponding to the laser light 4 outputted from the laser radar 3 or its reflection and to transmit the processed signals to the recognizer unit 13.

The recognizer unit 13 serves to recognize light-reflecting objects such as overhead beam reflectors, a car 5 in front and the road surface on the basis of the signals supplied from the signal processor 12 and to measure the distance to the object. The measured distance is communicated to the control unit 11, a displacement detector 14 and a safety judging part 15. The displacement detector 14 serves to carry out a specified calculation on the basis of the distance to the object communicated from the recognizer unit 13 to obtain the displacement of the optical axis from a reference direction. If the displacement is adjudged to be greater than a preset threshold angle, a command is sent to a warning device 16 to output a warning signal.

Figure 5:
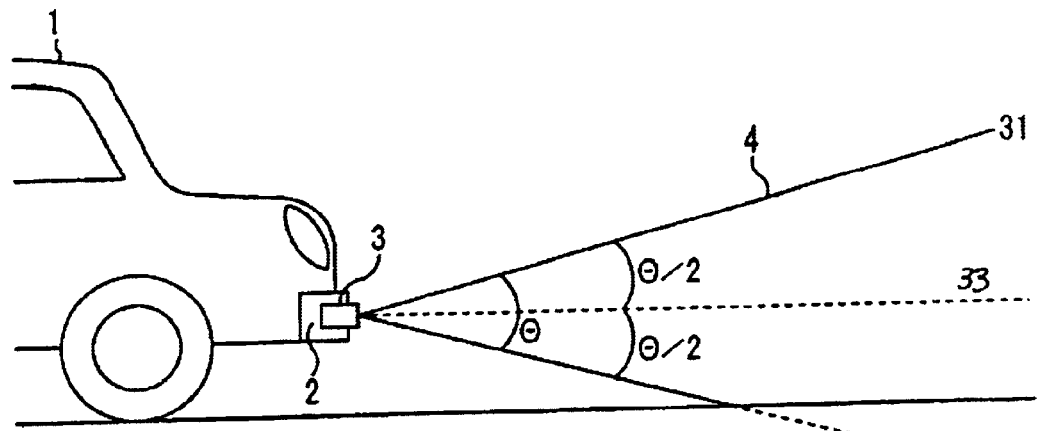
FIG. 5 is a schematic drawing for showing the spread of laser light emitted from the detector.

As shown in FIG. 5, the laser light 4 emitted from the laser radar 3 has a specified vertical spread $\Theta$. Its upper and lower limits, of the boundary for the portion with a usable intensity level) are hereinafter referred to as the upper boundary beam 31 and the lower boundary beam 32. The angle $\Theta$ between the upper and lower boundary beams 31 and 32 is the aforementioned spread. The optical axis 33 of the laser light 4 is defined as the direction of the line which bisects the angle $\Theta$.

With reference back to FIG. 4, the safety judging part 15 serves to determine on the basis of the distance to the reflector inputted from the recognizer unit 13 whether the car 5 in front is at a safe distance or not. If it is adjudged to be not a safe distance, a command is transmitted to the warning device 16 to output a warning. The warning device 16 serves to output a warning in response to a command either from the displacement detector 14 or from the judging part 15. In FIG. 4, numeral 21 indicates a speedometer of the car 1 for constantly measuring its speed and transmitting the data to the control unit 11.

When a certain period of time (such as one day) has passed since a detection process for the displacement of optical axis was carried out last, the control unit 11 of the detector 2 starts a series of processes for detecting a displacement of the optical axis.

This process is explained next with reference to the flowchart of FIG. 6 when overhead beam reflectors are used. First, the laser light 4 is emitted from the laser radar 3 (Step S1). As the emitted laser light 4 is reflected from various light-reflecting objects on the road surface and is received by the laser radar 3 (Step S2), signals (reflection signals) corresponding to the reflected light are inputted to the signal processor 12. The recognizer unit 13 determines the presence or absence of an object and calculates the distance to a target object on the basis of the reflection signal on which a specified process has been carried out by the signal processor 12 (Step S3). Next, the recognizer unit 13 determines whether the recognized object was an overhead beam reflector (Step S4). The control unit 11 waits until a signal is received from the recognizer unit 13 that an overhead beam reflector has been recognized.

Figure 7A:
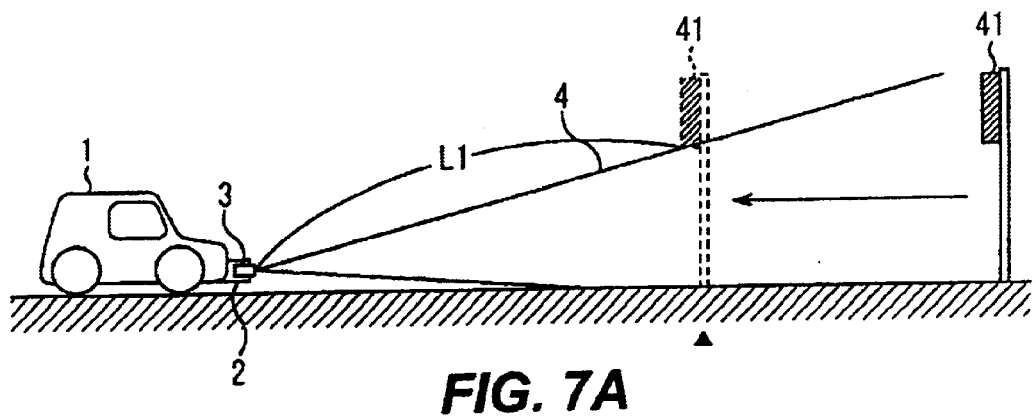
FIGS. 7A and 7B are schematic drawings for showing the method of using an overhead beam reflector with a known height in detecting the displacement of optical axis.

FIG. 7A shows the relationship with the car 1 and an overhead beam reflector 41. As the car 1 keeps running to the right with laser light 4 emitted forward from its laser radar 3 installed on the car 1, the overhead beam reflector 41 approaches from a farther position where it is shown by solid lines to a nearer position where it is shown by broken lines. As the car 1 comes close enough to the overhead beam reflector 41 to receive the laser light 4 reflected by it, this signal is processed by the signal processor 12 and then inputted to the recognizer unit 13 which compares the inputted signal with a reference signal to recognize that the reflected light was from an overhead beam reflector. The reference signal is preliminarily measured experimentally and stored. When a signal from the recognizer unit 13 is received by the control unit 11 to the effect that an overhead beam reflector 41 has been recognized (YES in Step S4), the control unit 11 obtains signals from the speedometer 21 to check whether the car 1 is running at a constant speed (Step S5). If the car 1 is not running at a constant speed (NO in Step S5), the process in Step S4 is repeated.

If the control unit 11 concludes in Step S5 that the car 1 is running at a constant speed (YES in Step S5), the recognizer unit 13 responds to a command from the control unit 11 to calculate the distance between the laser radar 3 and the overhead beam reflector 41 at the moment immediately before the laser radar 3 becomes incapable of detecting the overhead beam reflector 41 (Step S6). This moment is indicated by a dark triangle in FIG. 7A where the overhead beam reflector 41 moves upward out of the range reachable by the laser light 4 and the overhead beam reflector 41 becomes "lost" thereafter to the recognizer unit 13. The recognizer unit 13 calculates the distance indicated by L1 at this moment and transmits this distance to the displacement detector 14.

Next, the displacement detector 14 calculates the displacement of the optical axis on the basis of the distance L1 obtained by and received from the recognizer unit 13 (Step S7), as will be described in detail below. Next, the displacement detector 14 determines whether the calculated displacement of the optical axis is within a specified range and if it is within this range (YES in Step 8), the process is completed. If the displacement is found to be greater than the specified range (NO in Step S8), a command is outputted from the displacement detector 14 to the warning device 16 to output a warning signal and the warning device 16 responds to this warning signal by outputting a warning signal (Step S9), say, by displaying an indicator showing the displacement of the optical axis or by outputting a vocal warning to the driver.

As an alternative, a car navigation system may be used for the purpose of this invention. For example, the positions of overhead beam reflectors are preliminarily stored in the memory of a car navigating system such that the detection process by the detector 2 is carried out in correlation with the operation of the car navigation system. For example, when the car navigation system recognizes that the car 1 is approaching an overhead beam reflector 41, this may be signaled to the detector 2 and cause it to carry out the detection program described above for detecting the displacement of the optical axis. Data related to the height of each overhead beam reflector may be stored in the memory of a car navigation system such that the detector 2 can use such data in calculating the displacement of the optical axis.

As still another alternative, roadside structures other than overhead beam reflectors such as the entrance to a tunnel may be used as a reference indicator, preliminarily registered in the car navigation system. It now goes without saying that the present invention is not limited to the use of laser light by the detector.

Figure 6:
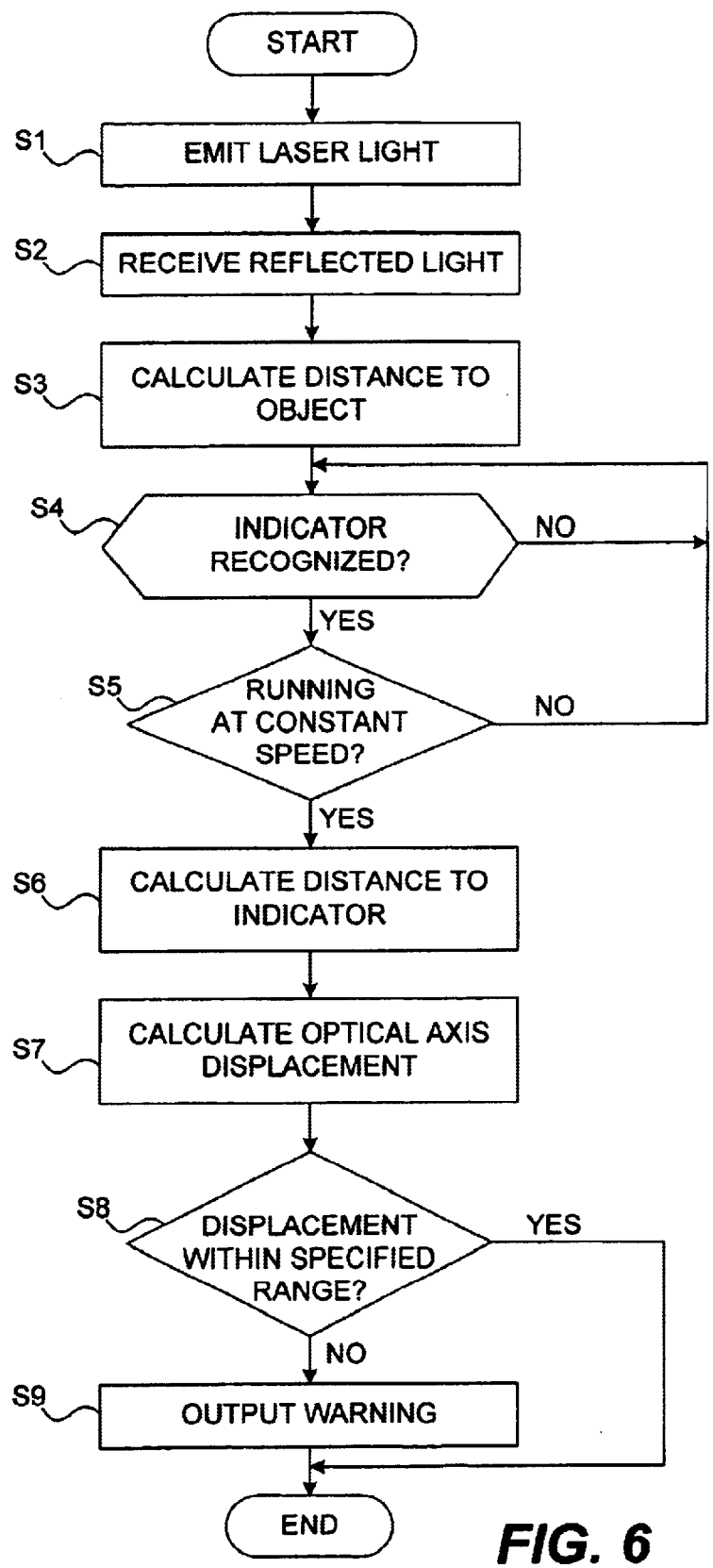
FIG. 6 is a flowchart of the operation of the detector of FIG. 4.

Next, the method of calculating the displacement of the optical axis carried out in Step S7 in the flowchart of FIG. 6 is explained with reference to FIG. 8 which shows the positional relationship among the car 1, an overhead beam reflector 41 and the laser light 4 when the overhead beam reflector 41 is about to be lost to the laser radar 3. Distance L1 between the laser radar 3 and the overhead beam reflector 41 is already calculated by the recognizer unit 13 in Step S6 as described above. The height h of the laser radar 3 from the road surface 52 is already measured when it is attached to the car 1. In Japan, the height H of the overhead beam reflector 41 (from the road surface 52 to the bottom) is standardized to be 5 m (with exceptions between 4.7 m and 6 m). Numeral 51 indicates a horizontal line at the height h of the laser radar 3.

Figure 8:
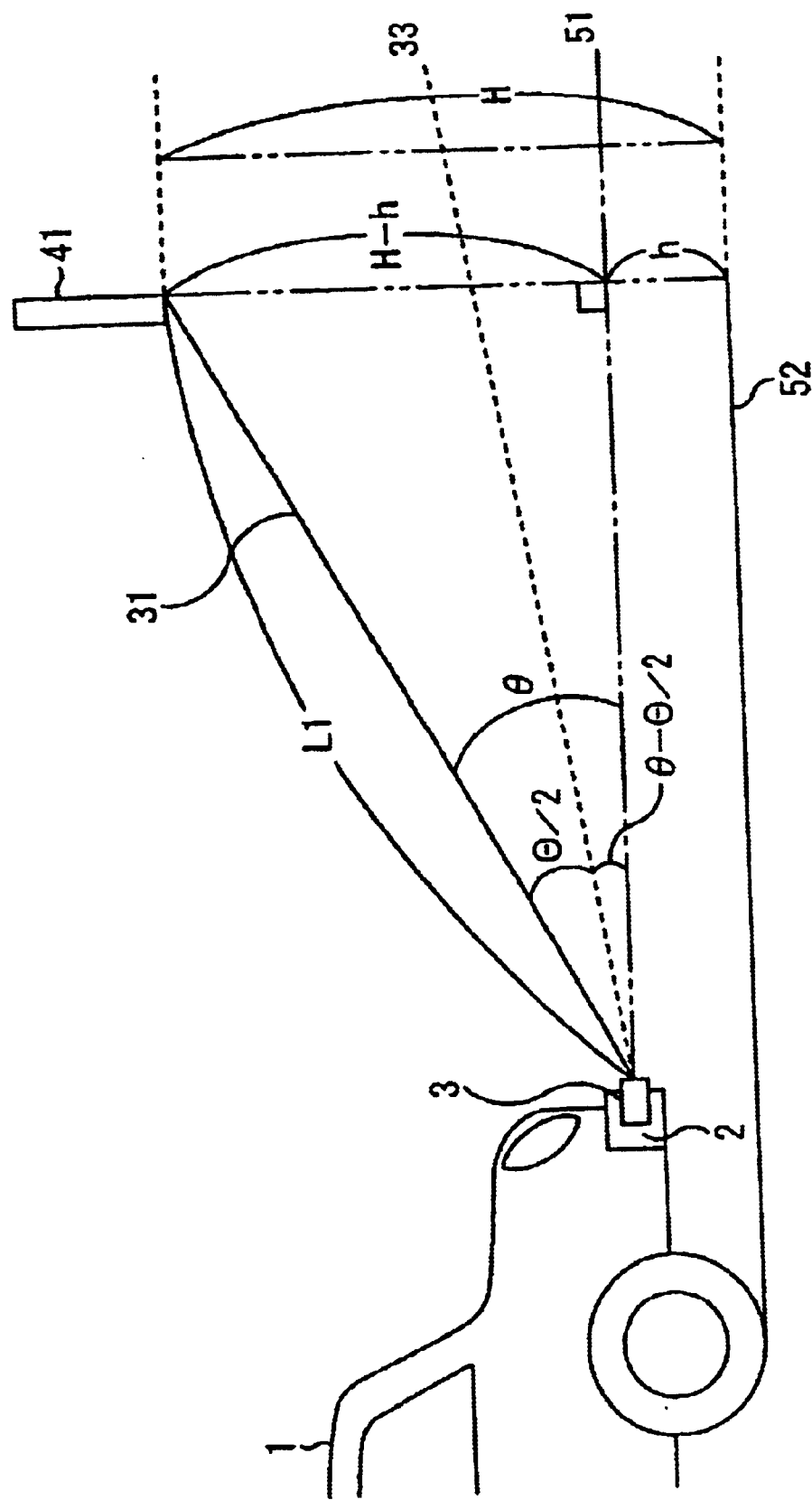
FIG. 8 is a drawing for showing a method of calculating a displacement of optical axis.

From FIG. 8, the angle θ from the horizontal line 51 of the line segment of length L1 connecting the position of the laser radar 3 with the bottom of the overhead beam reflector 41 is obtained from the relationship given by $\sin θ = (H-h)/L1$. Since the optical axis 33 is represented as the line bisecting the angle between the upper boundary beam 31 and the lower boundary beam 32, as explained above with reference to FIG. 5, the slope (angle) of the optical axis 33 is obtained as $θ-Θ/2$ as measured from the horizontal line 51. This angle is regulated to be within a specified range. The deviation of the optical axis 33 can thus be determined from the measured value of this angle with respect to a specified angle determined by regulation.

Figure 7B:
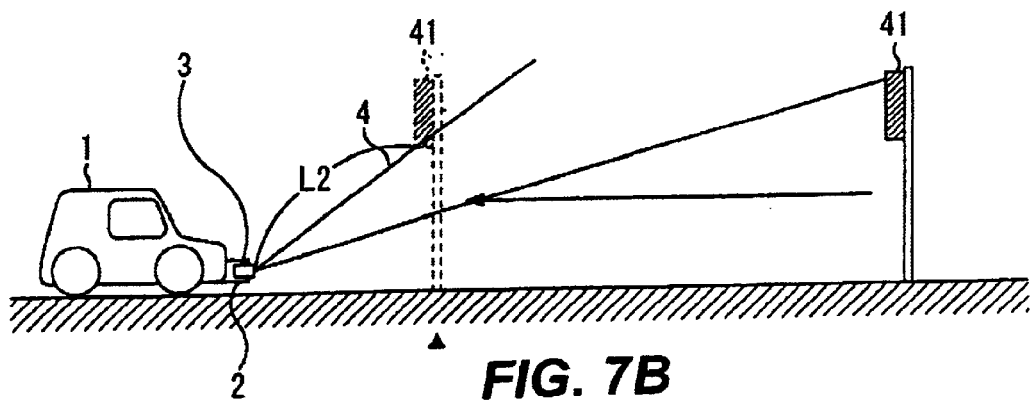

FIG. 7B shows the situation where the optical axis is displaced upward from the orientation specified by the regulation. The car 1 is again assumed to be traveling to the right and approaching an overhead beam reflector 41 which is indicated by solid lines when it is initially illuminated by the laser light 4 and by broken lines when it becomes lost to the detector 2. The distance between the laser radar 3 and the overhead beam reflector 41 at the latter moment is indicated by L2. FIG. 7B clearly shows that L2 is shorter than L1 because of the upward displacement of the orientation of the optical axis of the laser light 4. From the measured distance L2, the angle of the optical axis 33 can be calculated as explained above with reference to FIG. 8 and if the displacement of this angle from the standard according to the regulation is determined to be large enough for the detector 2 to function normally, a warning is outputted to the driver, as explained above.

Figure 9:
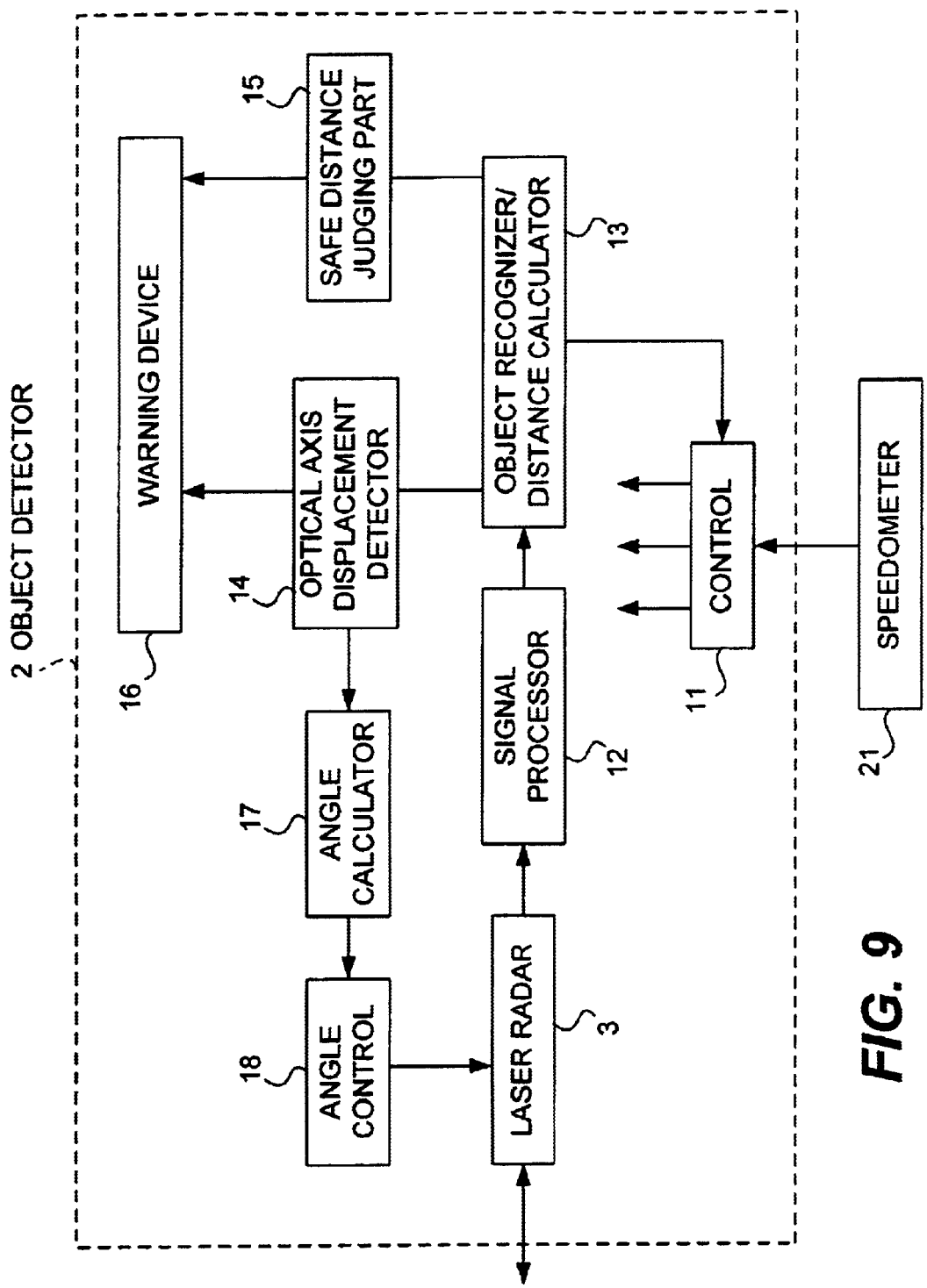
FIG. 9 is a block diagram of a variation of the detector shown in FIG. 4.
Figure 10:
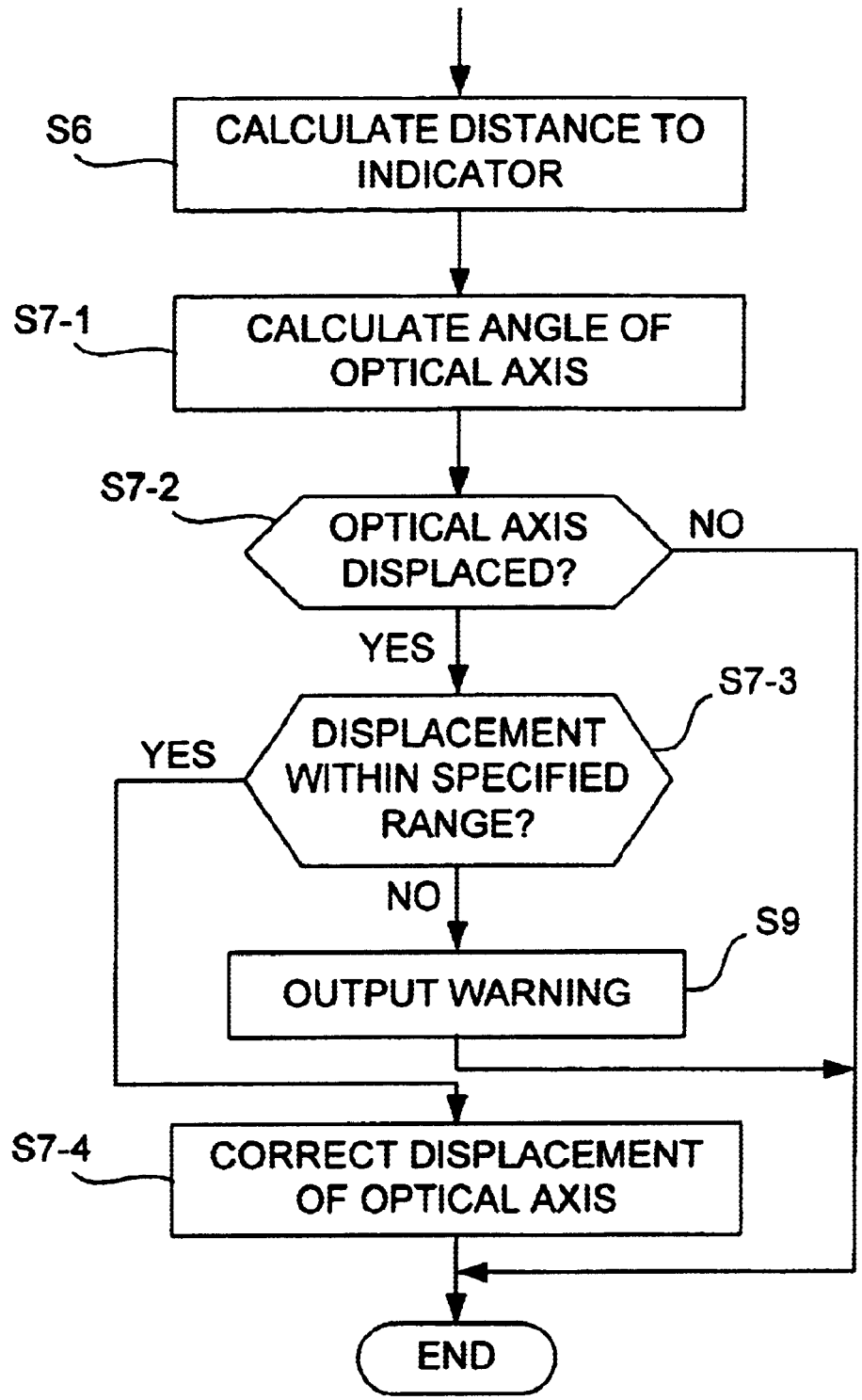
FIG. 10 is a portion of a flowchart of the operation of the detector of FIG. 9 which is different from the corresponding portion of the flowchart of FIG. 6.

FIG. 9 is a block diagram of a variation of the detector described above with reference to FIG. 4 for not only detecting the displacement of the optical axis but also correcting the displacement, further comprising an angle calculator 17 and an angle controller 18. FIG. 10 is a portion of the flowchart for the operation of this detector by which the flowchart of FIG. 6 is to be replaced. After the recognizer unit 13 calculates the distance between the laser radar 3 and the overhead beam reflector 41 at the moment immediately before the laser radar 3 becomes incapable of detecting the overhead beam reflector 41 (Step S6), the displacement detector 14 calculates the angle (slope) of the optical axis in a vertical plane (Step S7-1), as explained above. If it is determined from the angle thus calculated that the optical axis is not displaced (NO in Step S7-2), the program is completed because there is no need for a correction. If it is determined that the optical axis is displaced (YES in Step S7-2), the displacement detector 14 determines whether the displacement is small enough to be correctable, that is, whether the displacement is within a specified range (Step S7-3). If the displacement is small enough to be within the specified range (YES in Step S7-3), the information on the angle of the optical axis obtained in Step S7-1 is transmitted to the angle calculator 17. The angle calculator 17 thereupon calculates the angle for emitting the laser light 4 for correcting the displacement of the optical axis and transmits the calculated result to the angle controller 18. The angle controller 18, upon receiving the calculated result from the angle calculator 17, controls the laser radar 3 to correct the emission angle of the laser light 4 (Step S7-4). If the displacement detector 14 determines that the displacement is not small enough to be correctable (NO in Step S7-3), a warning signal is outputted from the warning device 16.

Figure 11:
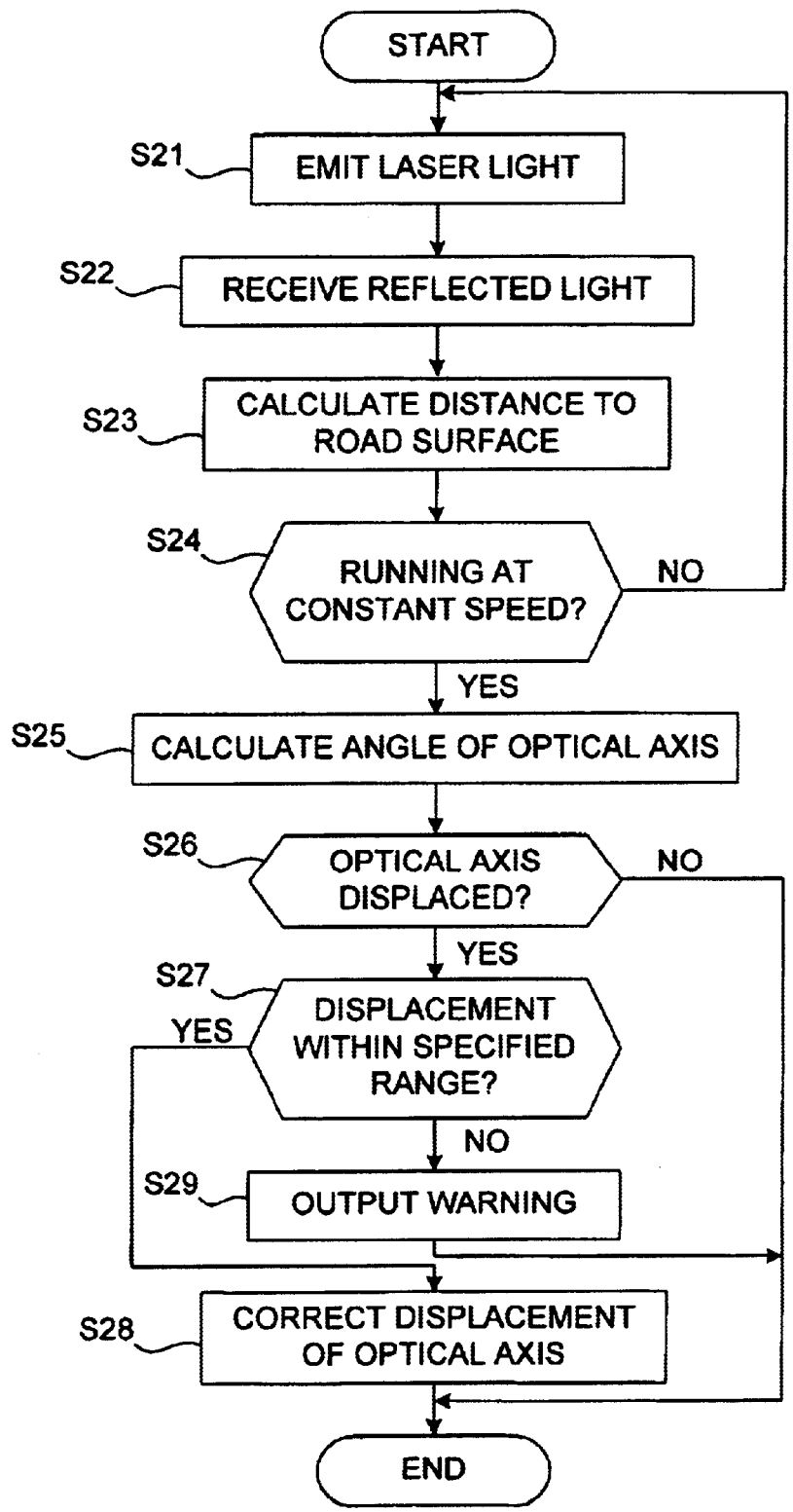
FIG. 11 is a flowchart of another operation of the detector of FIG. 9 for another method of detecting a displacement of optical axis.

FIG. 11 shows another method according to a second embodiment of the invention for detecting and correcting the displacement of the optical axis characterized as using reflection of the emitted light from the road surface 52 instead of an overhead beam reflector 41 as explained above. Process steps which are similar to those in the method using an overhead beam reflector may not be described repetitiously.

With reference to the flowchart of FIG. 11 and the schematic drawing of FIG. 12, the laser radar 3 emits the laser light 4 (Step S21) and receives the portion of the emitted laser light reflected back from various objects in front, including the road surface 52 (Step S22). A reflection signal corresponding to the reflected light received in Step S22 is transmitted to the signal processor 12, and the recognizer unit 13 identifies the reflected signal from the road surface 52 on the basis of the reflection signal processed by the signal processor 12 and calculates the distance to the road surface 52 where the reflection took place (Step S23). The identification is made by preliminarily obtaining a characteristic light quantity to be expected of a reflection signal and by comparing the received signal with this characteristic light quantity.

Next, the control unit 11 obtains the running speed of the car 1 from the speedometer 21 and determines therefrom whether the car 1 is running at a constant speed (Step S24). If the car 1 is not running in a stable manner at a constant speed (NO in Step S24), the steps described above are repeated until it is ascertained that the car 1 is running at a constant speed (YES in Step 24). If the car 1 is ascertained to be running at a constant speed (YES in Step S24), the displacement detector 14 calculates the angle of the optical axis in a vertical plane on the basis of the distance calculated by the recognizer unit 13 between the laser radar 3 and the road surface 52, as will be described in detail below (Step S25). The following steps (Steps S26–S29) are similar respectively to Steps S7-2, S7-3, S7-4 and S9 of FIG. 10.

As shown in FIG. 12, the detector 2 according to this embodiment makes use of reflected light from the road surface 52 received by the laser radar 3. The recognizer unit 13 not only determines whether the received light is reflected from the road surface 52 but also calculates the distance L3 between the laser radar 3 and the point of reflection on the road surface 52. The calculated distance L3 is then supplied to the displacement detector 14 which, on the basis of the received distance L3 and the known height h of the laser radar 3, calculates the angle θ of the received beam of light by the relationship $\sin \theta = h/L3$. The angle of the optical axis 33 is calculated as $\theta - \Theta/2$, as explained above with reference to FIG. 8.

FIGS. 13, 14 and 15 are referenced next to explain the step of correcting the displacement of the optical axis by different methods.

FIG. 13 shows a situation where the light beam 4A is upwardly displaced from the "correct" direction indicated by 4B where a car in front can be detected accurately. In such a situation, the optical axis will be determined in Step S26 of FIG. 11 as being displaced. Let us assume that it is determined in Step S27 that the displacement is small enough to be adjustable. This causes the angle calculator 17 to calculate the angle of emission of the laser light 4 on the basis of the information on the angle of the optical axis inputted from optical axis displacement detector 14. The angle controller 18 controls the laser radar 3 according to the result of calculation by the angle calculator 17 to correct the light beam 4A to the position of 4B. This may be done, for example, by preliminarily providing the detector 2 with a driver mechanism for rotating the laser radar 3 in a vertical direction and to rotate the laser radar 3 by such a driver mechanism so as to continuously change the angle of the optical axis by the angle calculated by the angle calculator 17. It goes without saying, however, that such a driver mechanism is not intended to limit the scope of the invention.

FIG. 14 shows another method for correcting the displacement of the optical axis, characterized wherein the detector 2 is adapted to be able to change the direction of the emitted laser light by specified angles, or to selected one, for example, out of three beams of laser light 4C, 4D and 4E. The angle controller 18 corrects the displacement of the optical axis by switching from one to another of them according to the information on the angle of the optical axis calculated by the angle calculator 17. The number of choices (three in the example shown in FIG. 14) is not intended to limit the scope of the invention. The detector 2 may be designed to be able to select one from as many as ten angles. These methods shown by FIGS. 13 and 14 are different essentially in that the angle of the optical axis is changed continuously by the former and discontinuously by the latter.

FIG. 15 shows a third method of correcting the displacement of the optical axis by combining the first two methods. When the laser light is upwardly displaced as shown by dotted lines 4F, the angle controller 18 makes a switch to the light 4G (shown by broken lines) which is the closest to the standard angle by the same method explained above with reference to FIG. 14. The angle controller 18 then changes the light 4G to 4G' (shown by solid lines) by the method explained above with reference to FIG. 13.

Even if the optical axis of the laser light 4 emitted from the laser radar 3 is oriented correctly, there are situations where the car in front cannot be detected because of the sloping condition of the road. FIG. 3 illustrates a situation where the road ahead is uphill but a similar problem occurs when an uphill road become flat, when a flat road become downhill and in many other ways the slope of the road changes.

Figure 16:
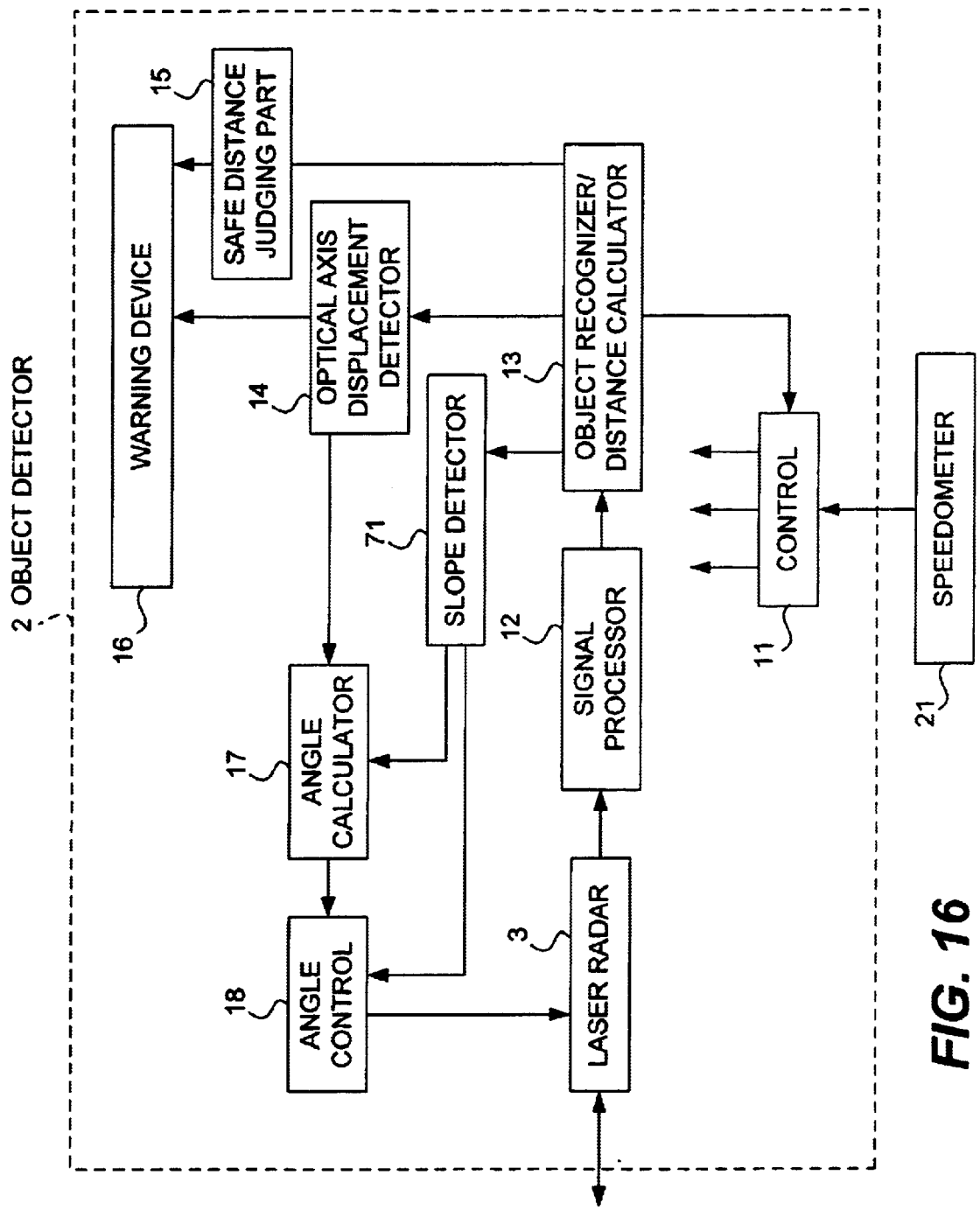
FIG. 16 is a block diagram of another detector embodying this invention.

FIG. 16 is a block diagram of still another detector 2 embodying this invention addressed to such problems caused by the slope of the road. This detector 2 is characterized as having a road slope detector 71 between the recognizer unit 13 and the angle calculator 17. The road slope detector 71 serves to detect the slope of the road ahead by carrying out a specified calculation on the basis of the distance to the road surface obtained by the recognizer unit 13 and to determine whether or not the angle of the laser light 4 to be emitted should be changed. If it is determined that such a change is required, the timing for effecting such a change is calculated. Data on the slope of the road are transmitted to the angle calculator 17 and the data on the timing for effecting the change are transmitted to the angle controller 18. In other aspects, the circuit structure shown in FIG. 16 is the same as shown in FIG. 9.

Figure 17:
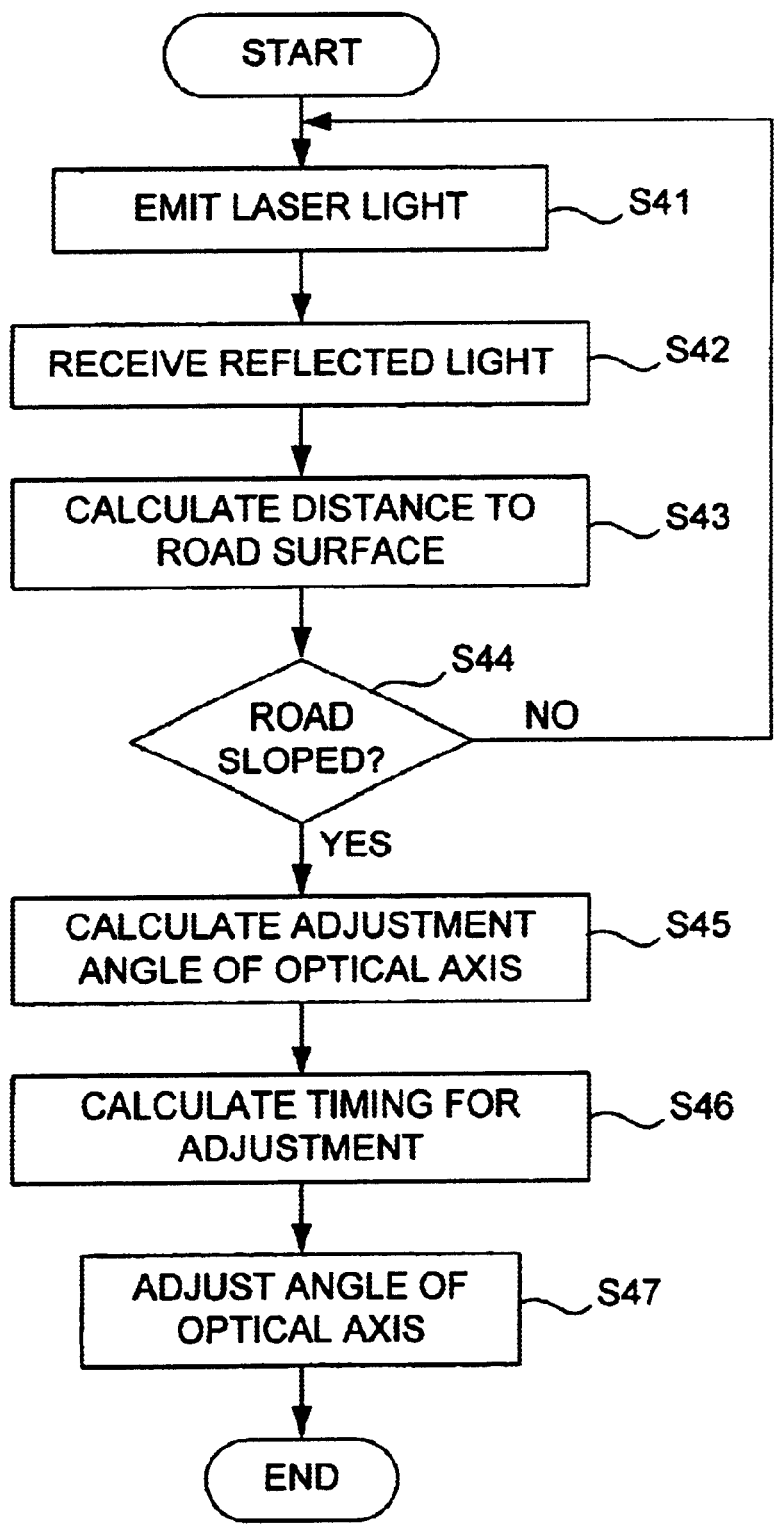
FIG. 17 is a flowchart for the operation of the detector of FIG. 16.

Operations by the detector 2 of FIG. 16 are explained next with reference to the flowchart of FIG. 17 and also FIGS. 18A and 18B.

As shown in FIGS. 18A and 18B, laser light 4 is emitted from the laser radar 3 (Step S41) and reflected light from objects including the road surface 52 itself is received (Step S42). The position on the road surface from where the laser light 4 reaches in indicated by an empty triangle. As explained above, a reflection signal corresponding to the reflected light received in Step S42 is transmitted to the signal processor 12 and the recognizer unit 13 identifies a reflection signal from the road surface 52 and calculates the distance to the road surface 52 on the basis of the reflection signal processed by the signal processor 12 (Step S43). A signal indicative of this distance calculated in Step S43 is transmitted to the road slope detector 71, and the slope of the road surface 52 is calculated therefrom and also compared with a specified range (Step S44). A detail of this calculation will be described below. In the case of a flat road surface 52 as shown in FIG. 18A (NO in Step S44), the process described above is repeated.

If the car 1 approaches an uphill portion 52b of the road from a flat portion 42a of the road, the uphill portion starting at a position indicated by letter T, as shown in FIG. 18B, the calculated distance to the uphill portion 52b of the road surface becomes shorter than if the road were completely flat as shown in FIG. 18A. Thus, the road slope detector 71 may conclude that the road is sloped (YES in Step S44).

The road slope detector 71 transmits the data on the slope of the road obtained in Step S44 to the angle calculator 17, and the angle calculator 17 calculates the appropriate angle for emission of the laser light 4 on the basis of the received data according to the road condition (Step S45). Thereafter, the road slope detector 71 calculates the timing for changing the direction of the optical axis of the laser light 4 by referencing the distance to the road surface 52b calculated in Step S43, the slope of the road surface calculated in Step S44 and the speed of the car 1 transmitted to the control unit 11 from the speedometer 21 (Step S46). The timing thus determined is outputted to the angle controller 18, and the angle controller 18 controls the laser radar 3 on the basis of the data on the angle of laser light 4 received from the angle calculator 17 and the data on the timing received from the road slope detector 71 and adjusts the angle of the optical axis of the laser light 4, as shown in FIG. 19, according to the timing calculated by the road slope detector 71 (Step S47).

FIG. 19 shows that the detector 2 has been adjusted such that the emitted laser light was as indicated by 4H as shown by dotted lines and was adjusted as indicated by 4J shown by solid lines. Thus, the car in front can be reliably detected by varying the direction of emission of laser light. Any of the methods explained above with reference to FIGS. 13–15 may be used for adjusting the direction of emission of laser light. The method, however, is not limited to these examples.

FIG. 20 is referenced next to explain one of methods for the road slope detector 71 to calculate the slope of the road 52b ahead. Let R indicate the position on the road 52b where the lower boundary beam 32 of the laser light 4 is reflected. The recognizer unit 13 calculates the distance L4 between the point of emission of the laser light 4 (indicated by Q) and R. The horizontal line passing through R is indicated by numeral 81 and the junctions between the vertical line passing through Q and line 81 and the road surface are respectively indicated by letters P and O. Point O is selected as the origin (0, 0) of a coordinate system, the x-axis being in the horizontal direction and the y-axis being in the vertically upward direction. Let the height H of the point of laser emission (Q) be a known quantity and the angle RPQ be defined as angle Q. Then, the coordinates (x, y) of point R are given as x=L4 sin Q and y=H–L4 cos Q.

The road slope detector 71 serves to continuously calculate the coordinates of point R on the basis of the distance L4 to the road surface 52b being constantly received from the recognizer unit 13, obtaining the slope of the road surface. Since the car 1 is moving, however, there is a displacement from one moment when the coordinates of point R are calculated to the next moment when they are calculated again. The road slope detector 71 takes this movement into account, calculating the slope of the road surface by using a formula which includes the effect of the motion of the car 1.

Although an example was explained above wherein the car is approaching an uphill road, the angle of laser light emission can be controlled also when the road is sloping downward. FIG. 21A shows a situation where the road 52 is flat. FIG. 21B shows a situation where the car 1 is on a flat part 52a of a road which becomes downhill (indicated by 52c) after position U. In both FIGS. 21A and 21B, an open triangle indicates the position where the laser light 4 emitted from the laser radar 3 is reflected by the road surface and the recognizer unit 13 calculates the distance to the position indicated by the triangle. FIGS. 21A and 21B show that the distance is greater if the road ahead is sloping downhill. The slope of downhill portion of the road 52c can be calculated similarly as explained above in the case of the road ahead sloping upward.

The invention was described above with reference to only a limited number of examples but these examples are not intended to limit the scope of the invention. Many modifications and variations are possible within the scope of the invention, and features of the illustrated examples may be combined or selectively made available. All such modifications, variations and combinations that may be apparent to a person skilled in the art are intended to be within the scope of the invention.

What is claimed is:

1. A detector for an object on a road surface, said detector comprising:
    beam emitting means for emitting a beam;
    beam receiving means for receiving reflected beam of the beam emitted from said beam emitting means by an object;
    distance measuring means for measuring a distance to said object from said reflected beam received by said beam receiving means;
    recognizing means for recognizing an overhead beam reflector with a known height based on the reflected beam received by said beam receiving means;
    distance identifying means for identifying a distance to said overhead beam reflector immediately before said overhead beam reflector becomes unrecognizable by said recognizing means; and
    displacement detecting means for detecting a directional displacement of the beam emitted from said beam emitting means based on the distance to said overhead beam reflector identified by said distance identified means.

2. The detector of claim 1 further comprising correcting means for correcting said directional displacement detected by said displacement detecting means.

3. The detector of claim 1 further comprising:
    displacement judging means for judging whether or not said directional displacement detected by said displacement detecting means is within a specified range; and
    warning means for outputting a warning signal when said displacement judging means judges that said directional displacement detected by said displacement detecting means is not within said specified range.

4. The detector of claim 1 wherein said detector is installed on a motor vehicle, said detector further comprising:
    speed detecting means for detecting a running speed of said motor vehicle; and
    speed judging means for judging whether or not said motor vehicle is traveling at a stable rate on the basis of outputs from said speed detecting means;
    wherein said displacement detecting means detects said directional displacement when said speed judging means judges that said motor vehicle is running at a stable rate.

5. The detector of claim 2 wherein said correcting means adjusts the direction of emission from said beam emitting means by continuously change the angle of said emission in a vertical direction.

6. The detector of claim 2 wherein said correcting means corrects said directional displacement by selecting one of a plurality of preselected angles in a vertical direction closest to a standard angle and causing said emission at said selected angle.

7. A method of detecting an object on a road surface, said method comprising the steps of:
   emitting a beam;
   receiving a reflected beam of the emitted beam, reflected by an object;
   measuring a distance to said object based on said reflected beam;
   recognizing an overhead beam reflector with a known height based on the received reflected beam;
   identifying a distance to said overhead beam reflector immediately before said overhead beam reflector becomes unrecognizable; and
   detecting a directional displacement of the emitted beam based on the distance to said overhead beam identified.

8. The method of claim 7 further comprising the step of correcting said directional displacement.

9. A detector for an object on a road surface, said detector comprising:
   beam emitting means for emitting a beam;
   beam receiving means for receiving reflected beam of the beam emitted from said beam emitting means by an object;
   distance measuring means for measuring a distance to said object from said reflected beam received by said beam receiving means;
   judging means for judging whether or not said object which reflected the emitted beam received by said receiving means was said road surface;
   distance identifying means for identifying a distance to said road surface if said judging means judges that said object was said road surface; and
   displacement detecting means for detecting a directional displacement of the beam emitted from said beam emitting means based on the distance to said road surface identified by said distance identified means.

10. The detector of claim 9 further comprising correcting means for correcting said detected displacement based on the distance to said road surface.

11. The detector of claim 9 further comprising:
    displacement judging means for judging whether or not said directional displacement detected by said displacement detecting means is within a specified range; and
    warning means for outputting a warning signal when said displacement judging means judges that said directional displacement detected by said displacement detecting means is not within said specified range.

12. The detector of claim 9 wherein said detector is installed on a motor vehicle, said detector further comprising:
    speed detecting means for detecting a running speed of said motor vehicle; and
    speed judging means for judging whether or not said motor vehicle is traveling at a stable rate on the basis of outputs from said speed detecting means;
    wherein said displacement detecting means detects said directional displacement when said speed judging means judges that said motor vehicle is running at a stable rate.

13. The detector of claim 10 wherein said correcting means adjusts the direction of emission from said beam emitting means by continuously change the angle of said emission in a vertical direction.

14. The detector of claim 10 wherein said correcting means corrects said directional displacement by selecting one of a plurality of preselected angles in a vertical direction closest to a standard angle and causing said emission at said selected angle.

15. A method of detecting an object on a road surface, said method comprising the steps of:
    emitting a beam;
    receiving a reflected beam of the emitted beam, reflected by an object;
    measuring a distance to said object based on said reflected beam;
    judging whether or not said object which reflected the received beam was said road surface;
    identifying a distance to said road surface if it has been judged that said object was said road surface; and
    detecting a directional displacement of the emitted beam based on said identified distance to said road surface.

16. The method of claim 15 further comprising the step of correcting said directional displacement.

17. A detector for an object on a road surface, said detector comprising:
    beam emitting means for emitting a beam;
    beam receiving means for receiving reflected beam of the beam emitted from said beam emitting means by an object;
    judging means for judging whether or not said object which reflected the emitted beam received by said receiving means was said road surface;
    distance measuring means for measuring a distance to said road surface based on said reflected beam received by said beam receiving means;
    slope calculating means for calculating a slope of said road surface based on said distance to said road surface measured by said distance measuring; and
    controlling means for controlling an angle of emission of the beam emitted from said beam emitting means based on the slope of said road surface calculated by said slope calculating means.

18. A method of detecting an object on a road surface, said method comprising the steps of:
    emitting a beam;
    receiving a reflected beam of the emitted beam, reflected by an object;
    judging whether or not said object which reflected the received beam was said road surface;
    measuring a distance to said road surface based on said reflected beam;
    calculating a slope of said road surface based on said measured distance to said road surface measured; and
    controlling an angle of emission of the emitted beam based on said calculated slope of said road surface.

* * * * *